United States Patent
Lin et al.

(10) Patent No.: US 8,441,464 B1
(45) Date of Patent: May 14, 2013

(54) CAPACITIVE TOUCH PANEL

(71) Applicants: Yu-Kai Lin, Hsinchu County (TW); Yih-Jer Lin, Hsinchu County (TW); Wen-Ju Chuang, Hsinchu County (TW)

(72) Inventors: Yu-Kai Lin, Hsinchu County (TW); Yih-Jer Lin, Hsinchu County (TW); Wen-Ju Chuang, Hsinchu County (TW)

(73) Assignee: Cando Corporation, Hsin-Chu Industrial Park, Hu-Kou, Hsin-Chu County (TW)

( * ) Notice: Subject to any disclaimer, the term of this patent is extended or adjusted under 35 U.S.C. 154(b) by 0 days.

(21) Appl. No.: 13/771,097

(22) Filed: Feb. 20, 2013

Related U.S. Application Data

(62) Division of application No. 12/715,324, filed on Mar. 1, 2010, now Pat. No. 8,405,634.

(30) Foreign Application Priority Data

Jul. 29, 2009 (TW) ................................ 98125476 A

(51) Int. Cl.
*G06F 3/045* (2006.01)

(52) U.S. Cl.
USPC .......................................... 345/174; 345/173

(58) Field of Classification Search ........... 345/173–182
See application file for complete search history.

(56) References Cited

U.S. PATENT DOCUMENTS

2012/0044187 A1* 2/2012 Polishchuk et al. .......... 345/174

* cited by examiner

*Primary Examiner* — Kevin M Nguyen
*Assistant Examiner* — Kenneth B Lee, Jr.
(74) *Attorney, Agent, or Firm* — Winston Hsu; Scott Margo

(57) ABSTRACT

A capacitive touch panel is disclosed. The capacitive touch panel includes a substrate having a plurality of sensing units, a frame having a hollow opening for accommodating the substrate, and an optical composite layer disposed on the frame. Two adjacent sensing units comprise a distance therebetween. the frame and the substrate form a composite structure. The optical composite layer includes a shielding layer and an ink layer, and the thickness of the shielding layer is adjusted with respect to the distance such that the sensing units are invisible from outside.

4 Claims, 6 Drawing Sheets

CAPACITIVE TOUCH PANEL

CROSS REFERENCE TO RELATED APPLICATIONS

This application is a division of U.S. application Ser. No. 12/715,324 filed on Mar. 1, 2010, and incorporated herein by reference in its entirety.

BACKGROUND OF THE INVENTION

1. Field of the Invention

The invention relates to a capacitive touch panel, and more particularly, to an improvement on the optical characteristic of the sensing structure of the touch panel.

2. Description of the Prior Art

Touch panels are widely used in various consumer electronic products, which allow users to use fingers or touch pen to select desired image or characters from the screen and input information and perform operations by touching the screen of the touch panel.

Touch panels are divided into various types according to different sensing methods, including resistive type, capacitive type, infrared ray type, and ultrasonic type. Infrared ray type and ultrasonic type touch panels preferably dispose an infrared ray or ultrasonic emission source on one side of the X-axis and Y-axis of the screen and set up a receiving source at the other side of the screen. When a user touches the screen, infrared ray or ultrasonic movement is interfered and the coordinates of the interference are measured and determined to complete a touch input. Resistive type touch panels are composed of two indium tin oxide (ITO) conductive films stacked on top of one another, and by applying pressure to electrically connect the two conductive films, a controller is used to measure the voltage difference of the panel and calculate the coordinates of the touch input. Capacitive type touch panels are composed of transparent glass substrates and an oxide metal coated on surface of the glass substrate. The sensing structures of the capacitive type touch panel is composed of two electrode layers electrically connected along an x-axis direction and a y-axis direction, and an insulating layer is disposed between the two electrode layers such that capacitive difference generated from fingers of a user and electrical field is used to determine an touch input.

Referring to FIGS. 1A-1B, FIGS. 1A-1B illustrate a sensing structure 10 of a capacitive touch panel according to the prior art. The sensing structure 10 of the touch panel is typically composed of a substrate 100 and a plurality of sensing units 110 disposed on the substrate 100, in which the sensing units 110 are disposed according to the same or different layer. A portion of the sensing units 110X are electrically connected along a first direction (such as X direction), whereas the other portion of the sensing units 110Y are electrically connected along a second direction (such as Y direction). The sensing units 110X and 110Y are not electrically connected to each other due to the presence of an insulating layer 120 therebetween. A passivation layer 130 is disposed to protect the sensing structure of the touch panel thereafter. By having this type arrangement, a capacitive sensing approach could be established to determine the coordinates touched by the user.

Preferably, the sensing units 110X and 110Y are separated by a distance D. Due to certain limitations from the fabrication process and prevention of electrical interference between sensing units electrically connected from different directions, the sensing units could not be disposed too close to each other and the range of the distance D is therefore restrained. However, the presence of the distance D in most circumstances, allows users to clearly see the array arrangement of the sensing units through the screen (as shown in FIG. 1B) and affects visual perception of the user substantially.

It is therefore a driving motive of the applicant to propose a capacitive touch panel capable of lowering the visibility of the sensing structure therein, and it has also be proven that the proposed structure also has the advantage of easy manufacture and low cost.

SUMMARY OF THE INVENTION

It is an objective of the present invention to provide a capacitive touch panel, which includes a sensing structure with ultra-low visibility, such that users were unable to see the arrangement of the sensing units within the touch panel from outside.

It is another objective of the present invention to provide a capacitive touch panel with low thickness, easy fabrication, and fast assembly with display module for increasing productivity.

The aforementioned objectives could be achieved from the following embodiments:

According to an embodiment of the present invention, a capacitive touch panel is disclosed. The capacitive touch panel preferably includes: a substrate having a plurality of sensing units thereon, wherein two adjacent sensing units comprise a distance therebetween; and a shielding layer covering the sensing units entirely, wherein the thickness of the shielding layer is adjusted with respect to the distance such that the sensing units are invisible from outside.

According to the aforementioned capacitive touch panel, wherein the distance between the sensing units is between 10-550 μm.

According to the aforementioned capacitive touch panel, wherein the thickness of the shielding layer is between 20-1300 μm.

According to the aforementioned capacitive touch panel, wherein the shielding layer comprises an adhesive layer having a thickness between 10-500 μm.

According to the aforementioned capacitive touch pane, wherein the shielding layer and the adhesive layer could be used together as a passivation layer for protecting the sensing units disposed on the substrate.

According to the aforementioned capacitive touch panel, wherein the shielding layer comprises a polyester film or a transparent film.

It is another aspect of the present invention to provide a capacitive touch panel. The capacitive touch panel includes: a substrate, having a plurality of sensing units and a plurality of dummy patterns thereon, wherein a first portion of the sensing units is connected along a first direction, a second portion of the sensing units is connected along a second direction, and the dummy patterns are disposed between two adjacent sensing units and electrically insulated to the sensing units; and a shielding layer covering the sensing units and the dummy patterns entirely, wherein the thickness of the shielding layer is adjusted with respect to distance between the sensing units and adjacent dummy patterns such that the sensing units are invisible from outside.

According to the aforementioned capacitive touch panel, wherein the shielding layer comprises an adhesive layer.

According to the aforementioned capacitive touch panel, wherein the shielding layer comprises a polyester film or a transparent film.

It is another aspect of the present invention to provide a capacitive touch panel. The capacitive touch panel includes: a substrate having a plurality of sensing units, wherein two adjacent sensing units comprise a distance therebetween; a frame having a hollow opening for accommodating the substrate, wherein the frame and the substrate form a composite structure; and an optical composite layer disposed on the frame, wherein the optical composite layer comprises a shielding layer and an ink layer, and the thickness of the shielding layer is adjusted with respect to the distance such that the sensing units are invisible from outside.

According to the aforementioned capacitive touch panel, wherein the thickness of the frame corresponds to the thickness of the substrate.

According to the aforementioned capacitive touch panel, wherein the frame comprises a plastic material or a metal material.

According to the aforementioned capacitive touch panel, the capacitive touch panel further comprises a passivation layer disposed on the substrate for protecting the sensing units.

It is another aspect of the present invention to provide a frame used for assembling a capacitive touch panel, the frame comprising a first side for accommodating a sensing substrate and a second side for assembling the sensing substrate to a display module and four edge portions, wherein at least two of the edge portions of the frame comprises a plurality of recesses for accommodating the sensing substrate and at least two of the edge portions of the frame comprises a plurality of fasteners for fastening the display module.

According to the aforementioned frame, wherein the frame comprises plastic material or metal material.

According to the aforementioned frame, wherein the edge portions of the frame comprising the recesses are identical to the edge portions of the frame comprising the fasteners.

According to the aforementioned frame, wherein the edge portions of the frame comprising the recesses are different from the edge portions of the frame comprising the fasteners.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention, preferred embodiments will be detailed in the following. The preferred embodiments of the present invention are illustrated in the accompanying drawings with numbered elements. Like numbered numerals designate similar or the same parts, regions or elements. It is to be understood that the drawings are not drawn to scale and are only for illustration purposes.

Figure 1A:
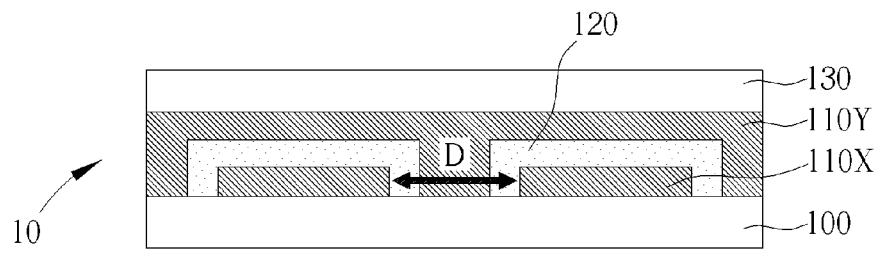
FIGS. 1A-1B illustrate cross-sectional and top views of a capacitive touch panel according to the prior art.
Figure 1B:
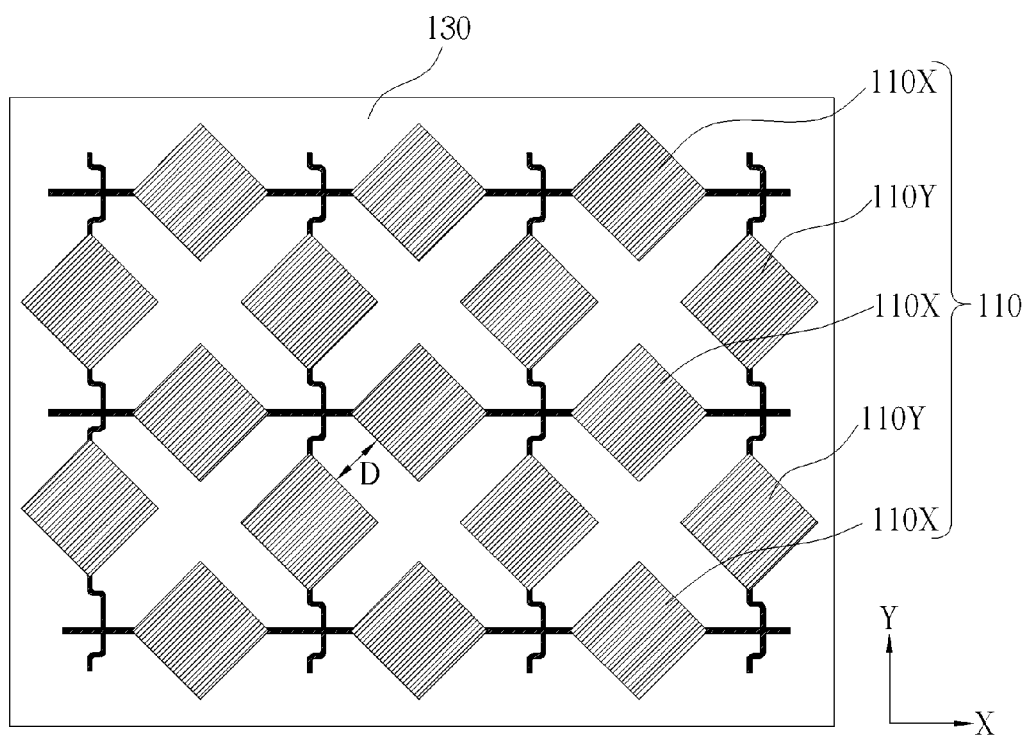
Figure 2A:
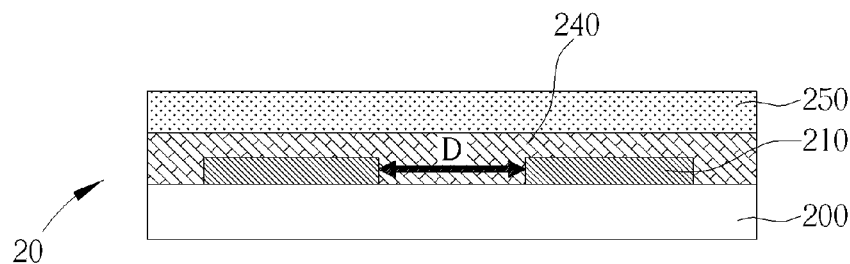
FIGS. 2A-2B illustrate cross-sectional and top views of a capacitive touch panel according to a preferred embodiment of the present invention.
Figure 2B:
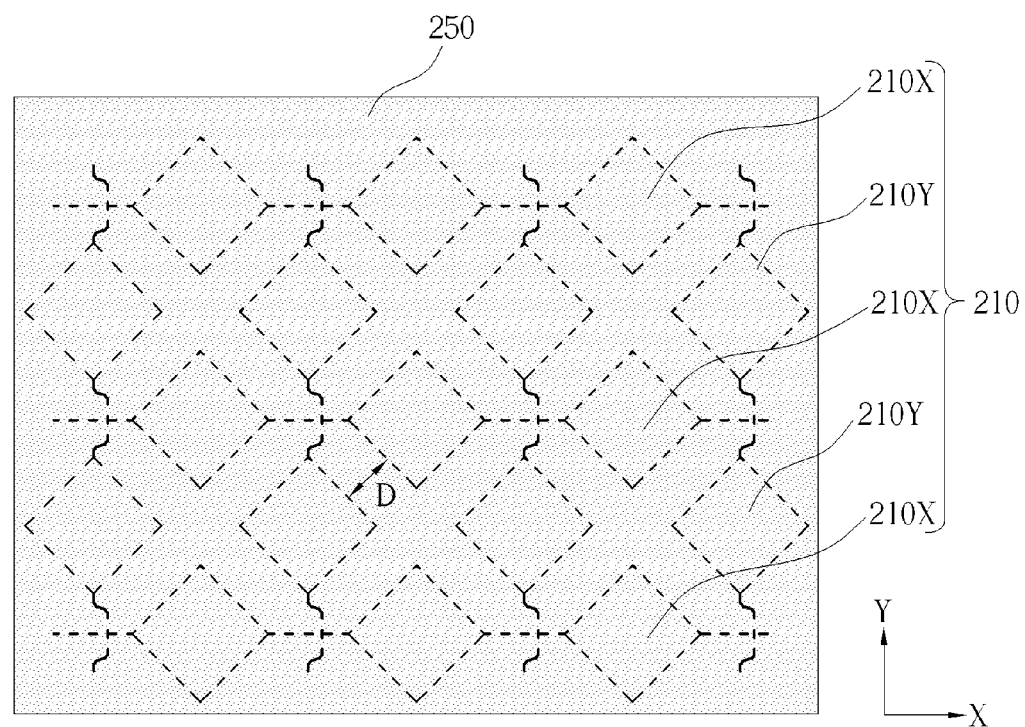

Referring to FIGS. 2A-2B, FIGS. 2A-2B illustrate a cross-sectional view and a top view of a capacitive touch panel according to a preferred embodiment of the present invention. Fabricated as a single layered sensing structure, the capacitive touch panel 20 preferably includes a substrate 200 and a single layer two dimensional sensing structure 210 disposed on the substrate 200, in which the two dimensional sensing structure 210 is composed of a plurality of sensing units 210X and 210Y. The capacitive touch panel 20 also includes a shielding layer 250 for protecting and shielding the two dimensional sensing structure 210 of the touch panel, in which the shielding layer 250 is adhered to the substrate 200 and the two dimensional sensing structure 210 through a transparent adhesive layer 240, such as a pressure sensitive adhesive (PSA) film. The shielding layer 250 and the adhesive layer 250 together could be served as a passivation layer for protecting the sensing units 210 disposed on the substrate 200.

In this embodiment, the shielding layer 250 is disposed on the sensing units 210X and 210Y and connecting wires of the sensing units entirely. The thickness of the shielding layer 250 is adjusted with respect to the distance D between the sensing units 210X and 210Y, such that the arrangement of the sensing units 210X and 210Y would not be visible from an external environment, as revealed in FIG. 2B.

According to a preferred embodiment of the present invention, the distance D between the sensing units 210X and 210Y is between 10-550 μm, the thickness of the corresponding shielding layer 250 is between 20-1300 μm, and the thickness of the adhesive layer 240 is between 10-500 μm.

The shielding layer 250 is preferably composed of a polyester film or a transparent film, which could be processed through optical or protective treatments including anti-reflective treatment, anti-glare treatment, hard coating treatment, or stain resistant treatment. Transparent film used for fabricating the shielding layer 250 is selected from a group consisting of polymethyl methacrylate (PMMA), polycarbonate (PC), polyethylene terephthalate (PET), and polyimide (PI), and the film selected from theses material could be further processed for desirable reflectivity, which is also within the scope of the present invention.

Figure 2C:
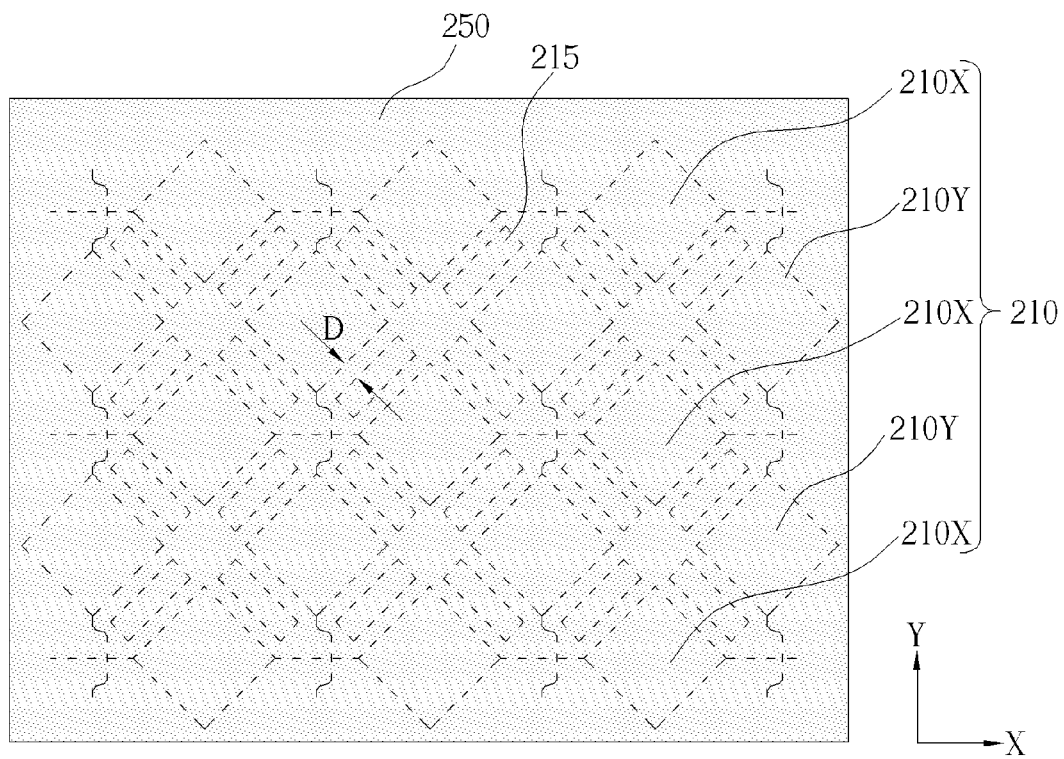
FIG. 2C illustrates a top view of a capacitive touch panel according to an embodiment of the present invention.

In order to further reduce the visibility of the sensing structures of the touch panel, a plurality of dummy patterns 215 are disposed between adjacent sensing units 210X and 210Y to further reduce the gap between the sensing units. As shown in FIG. 2C, the distance D' between the dummy pattern 215 and the sensing unit 210X (or 210Y) is significantly reduced, which effectively improves the visibility of the sensing structure and lowers the thickness of the shielding layer 250 accordingly.

Figure 3A:
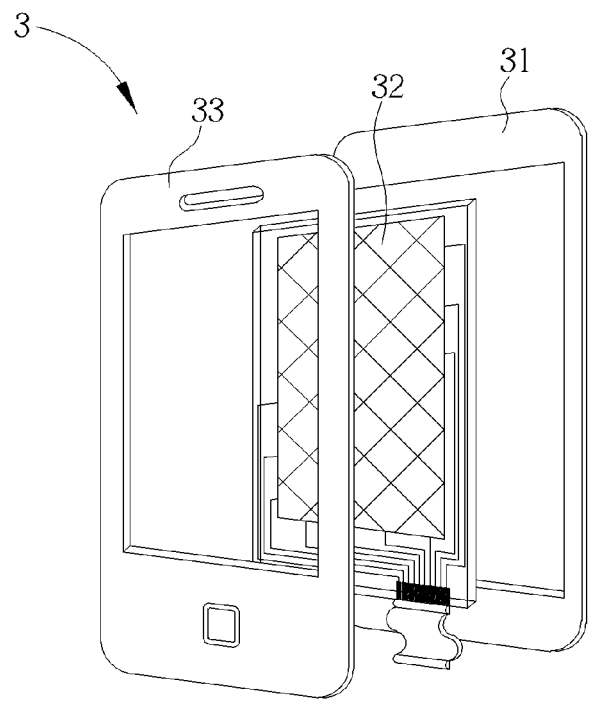
FIGS. 3A-3B illustrate structural and perspective views of a capacitive touch panel according to an embodiment of the present invention.
Figure 3B:
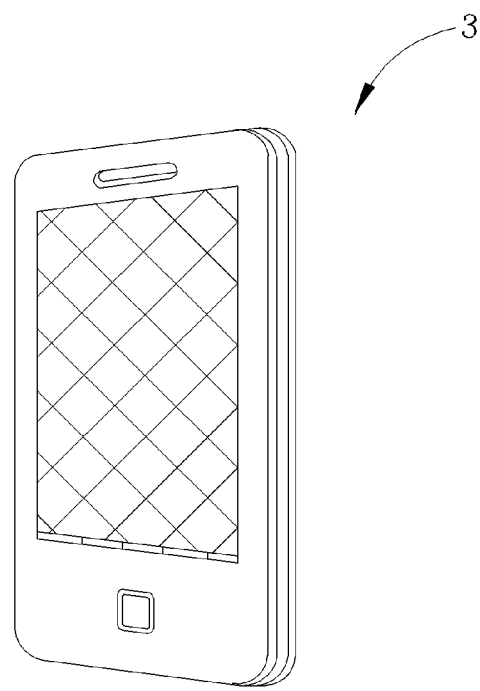
Figure 3C:
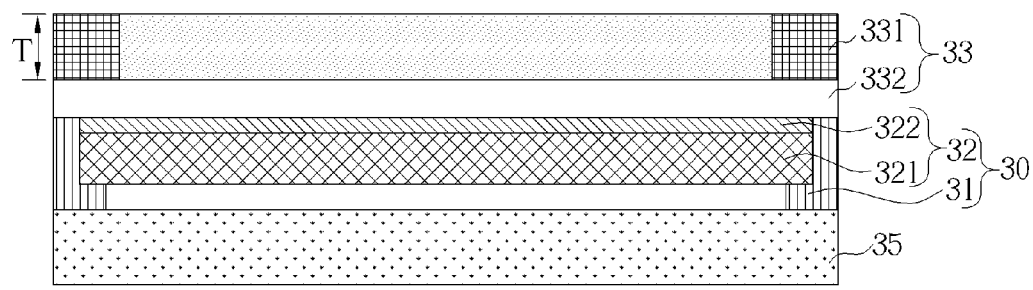
FIGS. 3C-3D illustrate a structural cross-sectional view and a top view of a capacitive touch panel according to an embodiment of the present invention.

In another aspect of the present invention, the substrate with the single layered two dimensional sensing structure is combined with a shielding layer having a decoration to form a composite structure, such as the capacitive touch panel of the present invention. The decoration is preferably a black ink pattern according to an embodiment of the present invention. The color of the decoration however is not limited to black, but could also be an ink pattern with other colors, which is also within the scope of the present invention. Referring to FIGS. 3A-3C, FIGS. 3A-3B illustrate perspective views of the capacitive touch panel according to another embodiment of the present invention and FIG. 3C illustrates a cross-sectional view of the touch panel.

Fabricated as a singled layered sensing structure, the capacitive touch panel 3 includes a frame 31, a touch substrate 32, and an optical composite layer 33. In this embodiment, the touch substrate 32 is pre-assembled with the frame 31 to form a composite structure 30, and later united with an optical composite layer 33 containing a shielding layer 331 with decoration and an adhesive layer 332. The united structure is then combined with a display module 35. The adhesive layer 332 is preferably used to bond the shielding layer 331 and the touch substrate 32, and could be composed of a pressure sensitive adhesive film. The touch substrate 32 includes a substrate 321 having a plurality of sensing units and a passivation layer 322. A plurality of sensing units disposed along X and Y directions are formed on the substrate 321, and the passivation layer 322 is disposed to cover the entire substrate 321 for protecting the sensing units. However, it should be noted that instead of forming the passivation layer 322 for protecting the sensing units, the optical composite layer 33 consisting of the shielding layer 331 and the adhesive layer 332 could be used directly as a passivation layer for protecting the sensing units disposed on the substrate 321, which is also within the scope of the present invention. By following this design, the formation of the passivation layer 322 could be omitted accordingly.

Figure 3D:
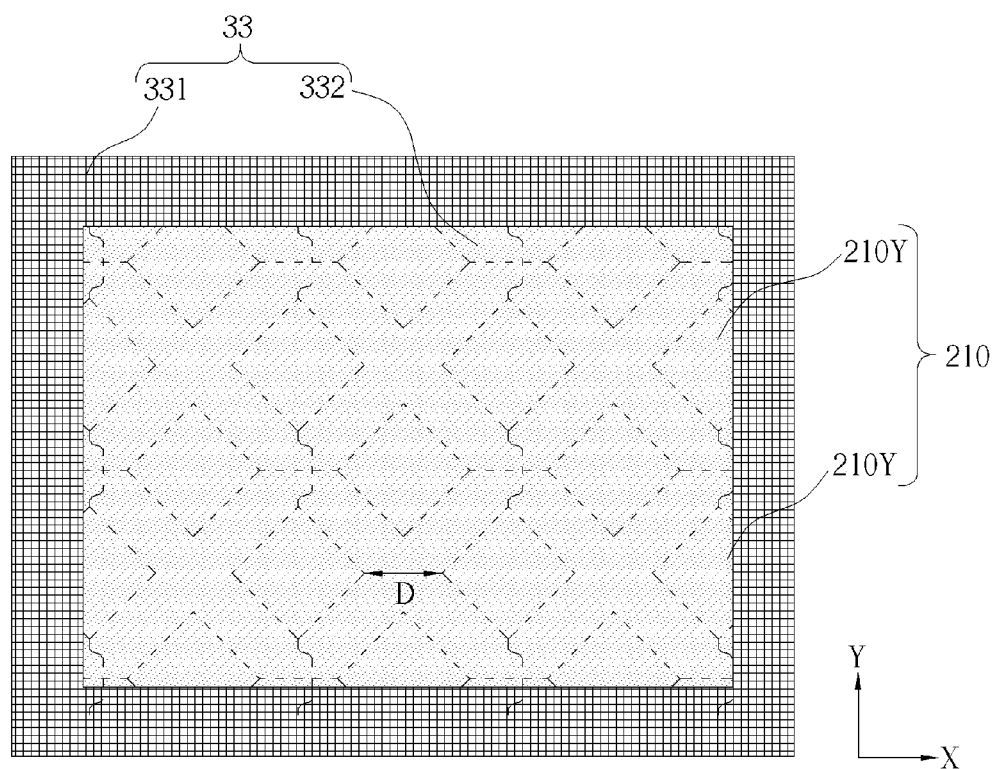

In this embodiment, the thickness of the frame 31 is adjusted with respect to the thickness of the touch substrate 32 for reducing the overall thickness of the module. Preferably, the thickness T of the shielding layer 331 containing decoration is adjusted corresponding to the distance (such as the distance D shown in FIG. 3D) between the sensing units, such that the arrangement of the sensing units are not visible from outside. Preferably, the width of the decoration within the shielding layer 331 is adjusted to cover the entire frame 31 underneath, as shown in FIG. 3D. In order to reduce the thickness of the touch panel and facilitate the assembly between the substrate and the display module, a touch panel structure with frame is also disclosed, as shown in FIG. 4.

Figure 4:
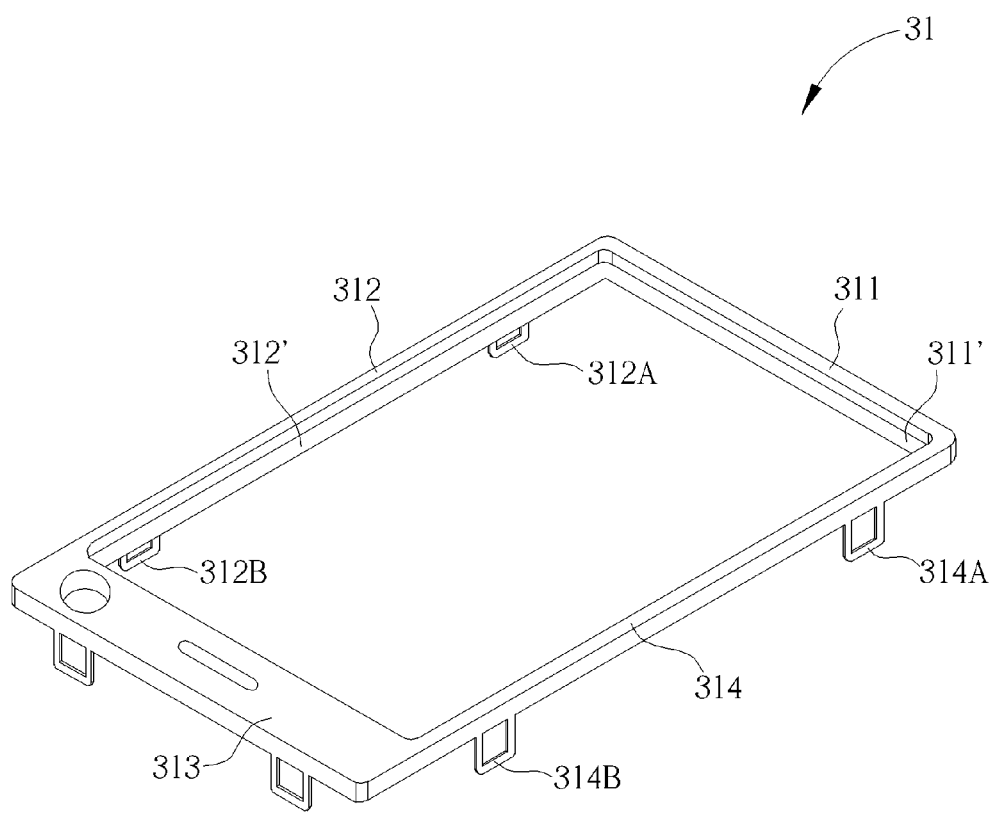
FIG. 4 illustrates a structural view of a frame used in assembly of a capacitive touch panel of the present invention.

Referring to FIG. 4, which illustrates a structural view of a frame 31 used in an assembly of a capacitive touch panel according to an embodiment of the present invention. The frame 31 is disposed on one side of a sensing substrate, and the fastener of the frame 31 is then used to assemble the sensing substrate to a display module from another side. The frame 31 includes four edge portions defining a central hollow opening for accommodating the sensing substrate, which could be composed of easily processed plastic or metal. The material of the frame could be selected according to the demand and overall cost of the product. A recess is formed on each side of at least two edge portions of the frame, and a fastener is formed on each of at least two edge portions of the frame for joining to the display module. As shown in FIG. 4, a recess (such as recesses 311' and 312') is formed on one side of the four edge portions 311/312/313/314, and at least one fastener 312A/312B/314A/314B is formed on each of the edge portions 312/314 for joining the display module.

In addition to the aforementioned embodiment, the recess could also be formed selectively on edge portions that do not contain any fastener, which is also within the scope of the present invention.

By using the improved touch panel and frame structure, the arrangement of the internal sensing structures of the touch panel could be substantially invisible from outside as users are using the touch panel. In addition to simple structure, easy fabrication, and low cost, the integration of the shielding pattern and dark ink pattern also facilitates full planarizing effect for the touch panel. Moreover, techniques from existing touch panels assembly could also be incorporated with the touch panel fabrication of the present invention, such as using a frame structure to quickly join a touch panel and a liquid crystal display module. It should be noted that the touch panel proposed above has the advantage of expandable applicability, novelty, and strong compatibility in the relative industry and the developmental value of this product is clearly significant.

OTHER EMBODIMENTS

It should be noted that every feature presented in this disclosure could be combined with other methods and every single characteristic proposed in the disclosure could be replaced selectively by same, equivalent, or similar feature. In addition to obvious features, every characteristic disclosed in the previous embodiments is merely an example.

It should also be noted that the embodiment of the present invention is not limited to the ones addressed above, those skilled in the art will readily observe that numerous modifications and alterations of the device and method may be made while retaining the teachings of the invention.

What is claimed is:

1. A capacitive touch panel, comprising:
 a substrate having a plurality of sensing units, wherein two adjacent sensing units comprise a distance therebetween;
 a frame having a hollow opening for accommodating the substrate, wherein the frame and the substrate form a composite structure; and
 an optical composite layer disposed on the frame, wherein the optical composite layer comprises a shielding layer and an ink layer, and the thickness of the shielding layer is adjusted with respect to the distance such that the sensing units are invisible from outside.

2. The capacitive touch panel of claim 1, wherein the thickness of the frame corresponds to the thickness of the substrate.

3. The capacitive touch panel of claim 1, wherein the frame comprises a plastic material or a metal material.

4. The capacitive touch panel of claim 1, further comprising a passivation layer disposed on the substrate for protecting the sensing units.

* * * * *